(12) United States Patent
Kiviahde et al.

(10) Patent No.: US 7,774,922 B1
(45) Date of Patent: Aug. 17, 2010

(54) POLYIMIDE TABBING METHOD FOR MANUFACTURING DISK DRIVE HEAD SUSPENSION COMPONENTS

(75) Inventors: Mark M. Kiviahde, Buffalo, MN (US); Jacob D. Bjorstrom, Hutchinson, MN (US); Ryan D. Kariniemi, Cokato, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 15 days.

(21) Appl. No.: 11/677,912

(22) Filed: Feb. 22, 2007

(51) Int. Cl.
*G11B 5/127* (2006.01)
*H04R 31/00* (2006.01)

(52) U.S. Cl. .............. 29/603.03; 29/603.04; 29/603.06; 360/244.8; 360/240; 360/244.2; 360/266.1

(58) Field of Classification Search .............. 29/603.03, 29/603.04, 603.06; 360/345.2, 240, 244.2, 360/244.5–244.8, 266.1
See application file for complete search history.

(56) References Cited

U.S. PATENT DOCUMENTS

| | | | |
|---|---|---|---|
| 281,387 A | 7/1883 | Moore | |
| 332,936 A | 12/1885 | Nash | |
| 340,129 A | 4/1886 | Kesel | |
| 358,662 A | 3/1887 | Heusler | |
| 4,413,404 A | 11/1983 | Burns | |
| 4,434,638 A | 3/1984 | Sivachenko | |
| 4,520,930 A | 6/1985 | Lisicki | |
| 5,041,317 A | 8/1991 | Greyvenstein | |
| 5,057,953 A | 10/1991 | Wanlass | |
| 5,187,625 A | 2/1993 | Blaeser et al. | |
| 5,198,945 A | 3/1993 | Blaeser et al. | |
| 5,640,763 A | 6/1997 | Lindberg | |
| 5,844,752 A | 12/1998 | Bozorgi et al. | |
| 5,870,252 A | 2/1999 | Hanrahan | |
| 5,924,187 A | 7/1999 | Matz | |
| 5,959,807 A | 9/1999 | Jurgenson | |
| 6,052,258 A * | 4/2000 | Albrecht et al. | 360/245.2 |
| 6,147,839 A | 11/2000 | Girard | |
| 6,466,412 B1 | 10/2002 | Adams et al. | |
| 6,477,014 B1 | 11/2002 | Erpelding | |
| 6,657,821 B1 | 12/2003 | Jenneke | |
| 6,697,227 B2 | 2/2004 | Kashima et al. | |
| 6,700,745 B2 | 3/2004 | Shiraishi | |
| 6,728,072 B1 | 4/2004 | Van Sloun et al. | |
| 6,741,424 B1 | 5/2004 | Danielson et al. | |
| 6,765,759 B2 | 7/2004 | Bhattacharya et al. | |
| 6,956,721 B1 | 10/2005 | Khan | |
| 7,016,159 B1 | 3/2006 | Bjorstrom et al. | |
| 7,207,097 B2 | 4/2007 | Detjens et al. | |
| 7,549,211 B1 | 6/2009 | Keranen et al. | |
| 2005/0195528 A1 * | 9/2005 | Bennin et al. | 360/234.5 |
| 2006/0158782 A1 | 7/2006 | Wakatsuki et al. | |

FOREIGN PATENT DOCUMENTS

JP 2000-57723 2/2000

\* cited by examiner

*Primary Examiner*—Paul D Kim
(74) *Attorney, Agent, or Firm*—Faegre & Benson LLP

(57) ABSTRACT

A method for manufacturing disk drive head suspension components includes supporting the components from carrier strips and/or other components by tab regions consisting substantially of a polyimide insulating layer. The components are detabbed by severing the insulating layer at the tab regions.

10 Claims, 5 Drawing Sheets

US 7,774,922 B1

POLYIMIDE TABBING METHOD FOR MANUFACTURING DISK DRIVE HEAD SUSPENSION COMPONENTS

FIELD OF THE INVENTION

The present invention relates generally to the manufacture of disk drive suspension components such as load beams and flexures. In particular, the invention is a structure and method for tabbing and detabbing the suspension components to carrier strips during manufacture.

BACKGROUND OF THE INVENTION

Additive and subtractive processes for manufacturing disk drive head suspension components such as flexures and load beams are known. During these processes the suspension components are supported on a panel between strips of metal known as carrier strips. Relatively small strips of metal known as tabs connect the components to the carrier strips and to one another during the manufacturing process. During subsequent assembly processes the tabs are cut or otherwise severed to "detab" the components from the carrier strips. Fine metal particles can be produced during these detabbing processes and adhere to the suspensions. Although the suspensions are typically cleaned before being incorporated into disk drives, the cleaning processes are not always successful at removing all the particles. Unfortunately, the particles not removed during the cleaning processes can still come loose in the disk drives and interfere with the drive operation. There remains, therefore, a need for improvements that reduce or prevent the adverse consequences that can result from metal particles produced during detabbing operations.

SUMMARY OF THE INVENTION

The present invention is a suspension component manufacturing method and product that provide reduced amounts of metal particulate during suspension detabbing operations. The suspension components include a first metal layer and a polymer layer. One embodiment of the invention comprises forming the suspension components supported from a carrier strip and/or from each other by tabs including detab regions consisting of the polymer layer. The polymer layer is severed at the detab regions to detab the suspension components from the carrier strip and/or from other components.

DETAILED DESCRIPTION OF THE PREFERRED EMBODIMENTS

Figure 1:
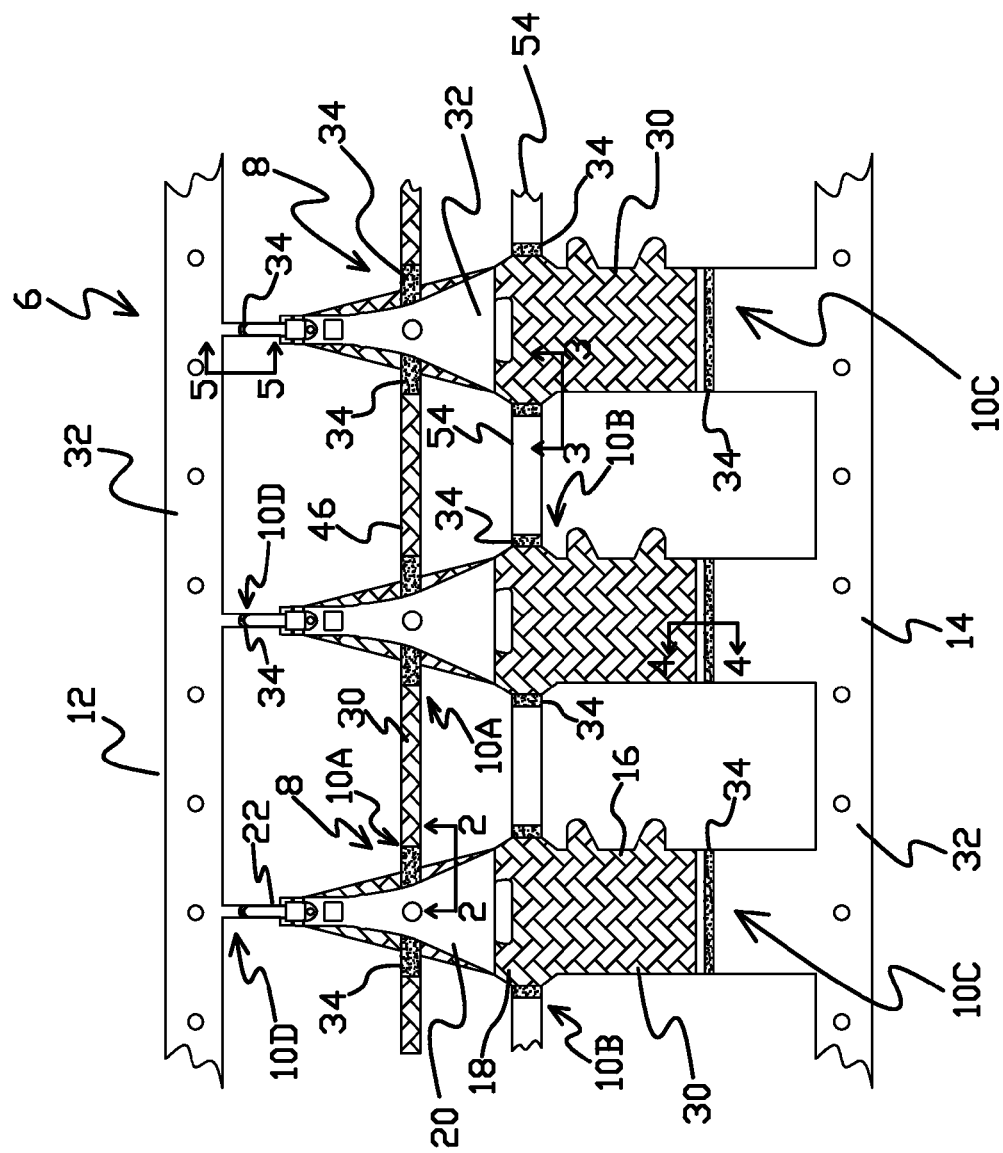
FIG. 1 is an illustration of a portion of a panel of suspension components including tabs in accordance with the invention.

FIG. 1 is an illustration of a portion of a panel 6 of load beams 8 including poly tabs 10A, 10B, 10C and 10D in accordance with several embodiments of the present invention. Panel 6 is a structure for supporting the load beams during the manufacturing process and includes carrier strips 12 and 14. The load beams 8 are connected to the carrier strips 12 and 14 by poly tabs 10D and 10C, respectively, and to one another by poly tabs 10A and 10B, in the illustrated embodiment. Load beams 8 (i.e., suspension components) include a mounting region 16, spring or hinge region 18, beam region 20 and headlift 22. Load beams 8, poly tabs 10A, 10B, 10C and 10D and carrier strips 12 and 14 include structures formed from one or more of a plurality of layers of material including a first metal layer 30 (the bottom layer indicated by cross hatching in FIG. 1), a second metal layer 32 (the top layer in FIG. 1) and an adhesive or insulating layer 34 between the first and second metal layers (indicated by stippling in FIG. 1). In one embodiment of the invention, metal layers 30 and 32 are stainless steel or other spring metal layers, and insulation layer 34 is a polyimide layer. In other embodiments (not shown), one of the metal layers is stainless steel, and the other is a conductive material such as copper or copper alloy. In still other embodiments (not shown) the poly tabs are formed from other polymer materials such as conductive polymers. Furthermore, the poly tab need not be formed from a part of the suspension providing other electrical and/or mechanical functions. Instead, the poly tab can be provided as a separate structure solely for the tabbing function.

Figure 2:
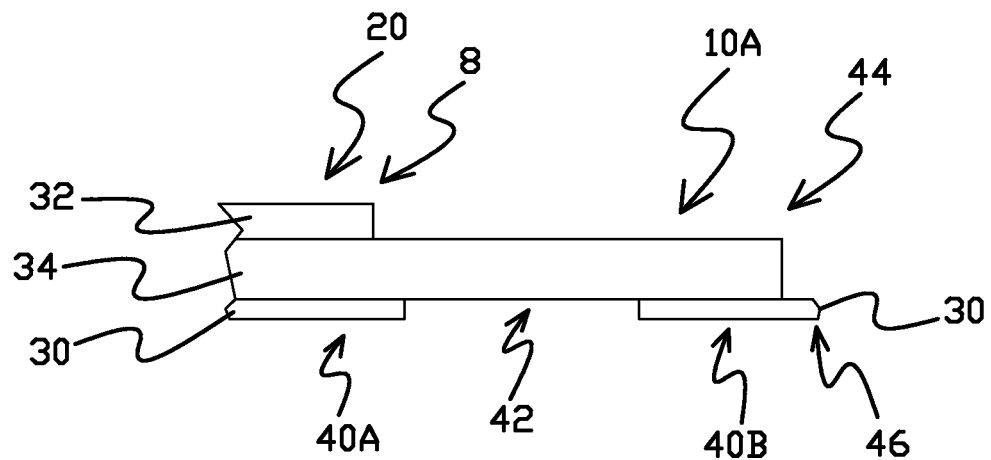
FIG. 2 is a detailed sectional view of one of the tabs shown in FIG. 1, taken at line 2-2 in FIG. 1.

FIG. 2 is a cross sectional illustration of a hip tab 10A extending from the beam region 20 of a load beam 8. As shown, tab 10A includes a pair of hip regions 40A and 40B on opposite sides of a detab region 42. The tabs 10A of adjacent load beams 8 are connected to one another by bridging portions 46. Region 40A is adjacent to the beam region 20 of the load beam 8, and includes only the first metal layer 30 and the insulating layer 34. Region 40B also includes only the first metal layer 30 and the insulating layer 34. Detab region 42 includes only the insulating layer 34. In the embodiment shown in FIG. 2, the insulating layer 34 at the tab 10A is continuous with the portions of the insulating layer on the beam region 20 of the load beam 8. In other embodiments (not shown) the portions of the insulating layer 34 at the tab 10A are discontinuous with portions of the insulating layer on either or both sides of the detab region 42. The insulating layer 34 of hip region 40A extends at least a sufficient distance onto the first metal layer 30 of the beam region 20 to provide sufficient strength for the tab 10A to provide its support function. Similarly, the insulating layer 34 of hip region 40B extends at least a distance onto the first metal layer 30 of the bridging portion 46 to provide sufficient strength for the tab to provide its support function. In other embodiments (not shown) the insulating layer 34 can extend from hip region 40B over greater portions or all of the bridging portion 46. In still other embodiments (not shown) portions of first metal layer 30 are removed from bridging portions 46.

Figure 3:
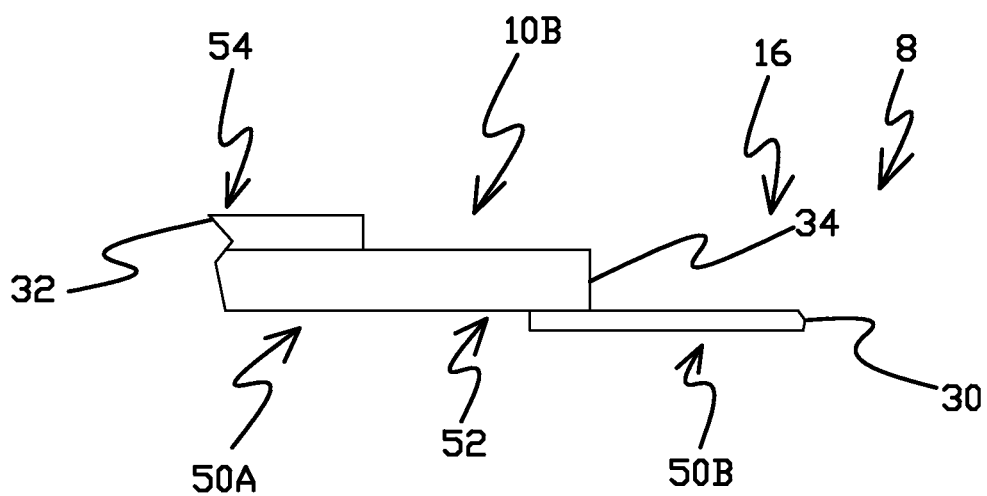
FIG. 3 is a detailed sectional view of another one of the tabs shown in FIG. 1, taken at line 3-3 in FIG. 1.

FIG. 3 is a cross sectional illustration of a transition tab 10B extending from the mounting region 16 of a load beam 8. As shown, tab 10B includes a pair of transition regions 50A and 50B on opposite sides of a detab region 52. The tabs 10B of adjacent load beams 8 are connected to one another by bridging portions 54. Region 50B is adjacent to the mounting region 16 of the load beam 8 and includes only the first metal layer 30 and the insulating layer 34. Region 50A includes only the second metal layer 32 and the insulating layer 34. Detab region 52 includes only the insulating layer 34. The insulating layer 34 of transition region 50B extends onto the first metal layer 30 of the mounting region 16 at least a distance that provides sufficient strength for the tab 10B to provide its support function. Similarly, the insulating layer 34 of transition region 50A extends at least a distance onto the second metal layer 32 of the bridging portion 54 to provide sufficient strength for the tab 10B to provide its support function. In other embodiments (not shown) the insulating layer 34 can extend from transition region 50A over greater portions or all of the bridging portion 54. In still other embodiments (not shown) portions of second metal layer 32 are removed from bridging portions 54.

Figure 4:
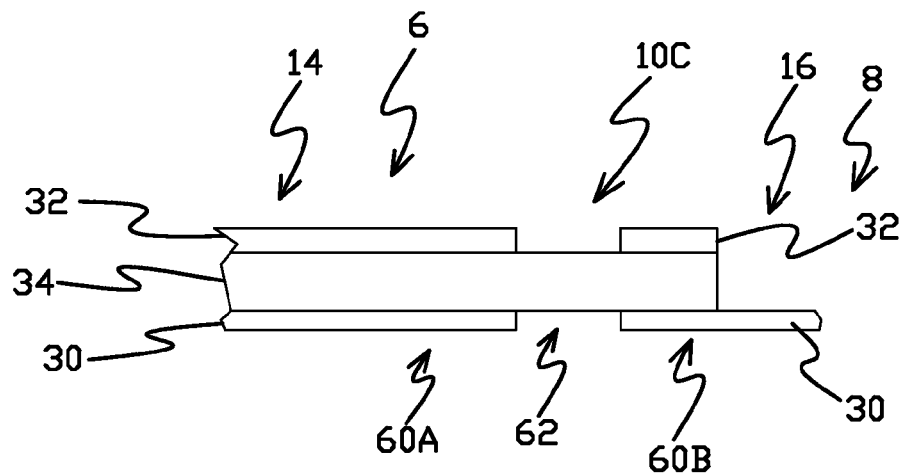
FIG. 4 is a detailed sectional view of yet another one of the tabs shown in FIG. 1, taken at line 4-4 in FIG. 1.

FIG. 4 is a cross sectional illustration of a full capture tab 10C extending from the carrier strip 14 to the mounting region 16 of a load beam 8. As shown, tab 10C includes a pair of capture regions 60A and 60B on opposite sides of a detab region 62. Region 60A is adjacent to the carrier strip 14 of the panel 6 and includes first and second metal layers 30 and 32 and insulating layer 34. Region 60B is adjacent to the mounting region 16 of the suspension 8 and also includes the first and second metal layers 30 and 32 and the insulating layer 34. Detab region 62 includes only the insulating layer 34. The insulating layer 34 of region 60B extends onto the first metal layer 30 of the mounting region 16 at least a distance that provides sufficient strength for the tab 10C to provide its support function. Similarly, the insulating layer 34 of region 60A extends at least a distance onto either or both of the metal layers 30 and 32 to provide sufficient strength for the tab 10C to provide its support function.

Figure 5:
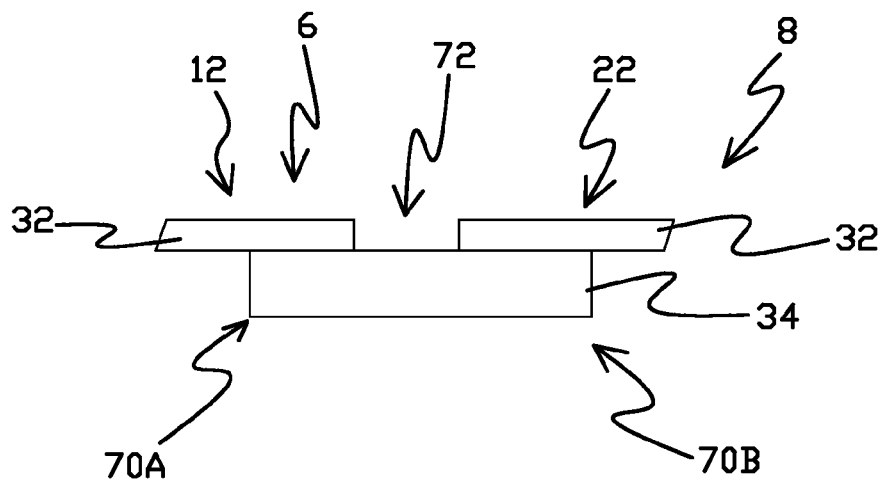
FIG. 5 is a detailed sectional view of still another one of the tabs shown in FIG. 1, taken at line 5-5 in FIG. 1.

FIG. 5 is a cross sectional illustration of a shoulder tab 10D extending between the headlift 22 of a load beam 8 and carrier strip 12. As shown, tab 10D includes a pair of shoulder regions 70A and 70B on opposite sides of a detab region 72. Region 70A is adjacent to the headlift 22 of the suspension 8, and includes only the second metal layer 32 and the insulating layer 34. Region 70B also includes only the second metal layer 32 and the insulating layer 34. Detab region 72 includes only the insulating layer 34. The insulating layer 34 of shoulder region 70A extends at least a distance onto the second metal layer 32 of the carrier strip 12 to provide sufficient strength for the tab 10D to provide its support function. Similarly, the insulating layer 34 of shoulder region 70B extends at least a distance onto the second metal layer 32 of the headlift 22 that provides sufficient strength for the tab 10D to provide its support function. In other embodiments (not shown) the insulating layer 34 can extend from shoulder regions 70A and/or 70B over greater portions or all of the second metal layer 32.

Panels 6 of load beams 8 having tabs such as 10A-10D can be manufactured using known or otherwise conventional additive and/or subtractive processes (e.g., photolithography, wet and dry etching and deposition processes). During the assembly of the load beams 8 with other suspension components (not shown), the insulating layer 34 at the detab regions 42, 52, 62 and 72 of tabs 10A-10D, respectively, can be cut, fractured (e.g., by pulling) or otherwise severed to separate the load beams from carrier strips 12 and/or 14 and one another. Conventional or otherwise known processes and equipment such as blades and laser ablating can be used during these separation operations. An important advantage of these tabs and separation approaches is that they can result in lower metal particle production than conventional metal tabs and associated separation processes. The possibility of metal particle contamination and associated complications on the suspensions and disk drives into which they are incorporated is thereby also reduced.

Figure 6:
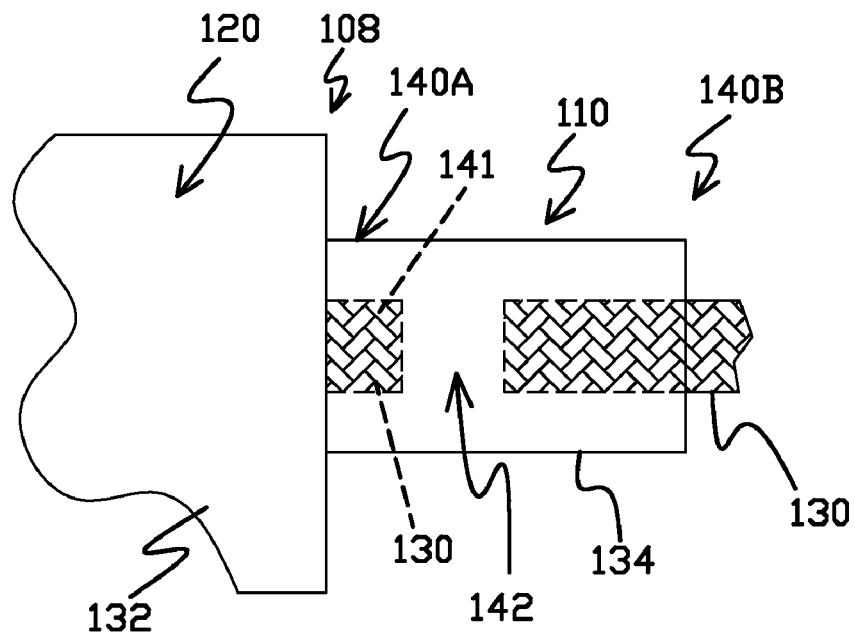
FIG. 6 is a detailed top view of a tab in accordance with another embodiment of the invention.

FIG. 6 is a detailed illustration of a portion of a load beam 108 suspended from another suspension component or a panel (neither of which is shown in the figure) by a poly tab 110 in accordance with another embodiment of the invention. The load beam 108 and poly tab 110 are formed from a laminate including a first metal layer 130, a second metal layer 132 and an adhesive insulating or other polymer layer 134 between the first and second metal layers. Tab 110 includes a pair of hip regions 140A and 140B on opposite sides of a detab region 142. Region 140A is adjacent to the beam region 120 of the load beam 108, and includes only a tab 141 in the first metal layer 130 extending from the load beam and the insulating layer 134. Region 140B also includes only the first metal layer 130 and the insulating layer 134. Detab region 142 includes only the insulating layer 134. As shown, the width of the insulating layer 134 of the tab 110 at regions 140A, 140B and 142 is greater than the width of the tab 141 and first metal layer 130 at regions 140A and 140B, respectively. The surface area of the insulating layer 134 overlaying the first metal layer 130 at regions 140A and 140B is sufficient to secure the insulating layer to the metal layer at these regions, while the greater width of the insulating layer provides greater tab support strength in the detab region 142.

Figure 7:
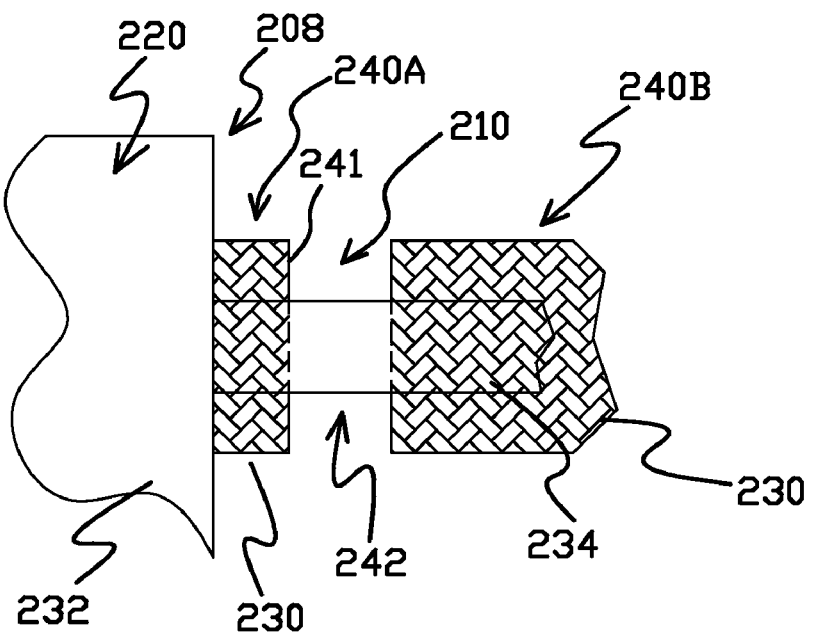
FIG. 7 is a detailed top view of a tab in accordance with yet another embodiment of the invention.

FIG. 7 is a detailed illustration of a portion of a load beam 208 suspended from another suspension component or a panel (neither of which is shown in the figure) by a poly tab 210 in accordance with another embodiment of the invention. The width of the insulating layer 234 of the tab 210 at hip regions 240A and 240B and detab region 242 is less than the width of the first metal layer 230 at the hip regions. Other than this difference, load beam 208 and tab 210 can be substantially the same or similar to those of load beam 108 and tab 110 described above in connection with FIG. 6, and similar reference numbers are used to identify similar features in the drawings.

Figure 8:
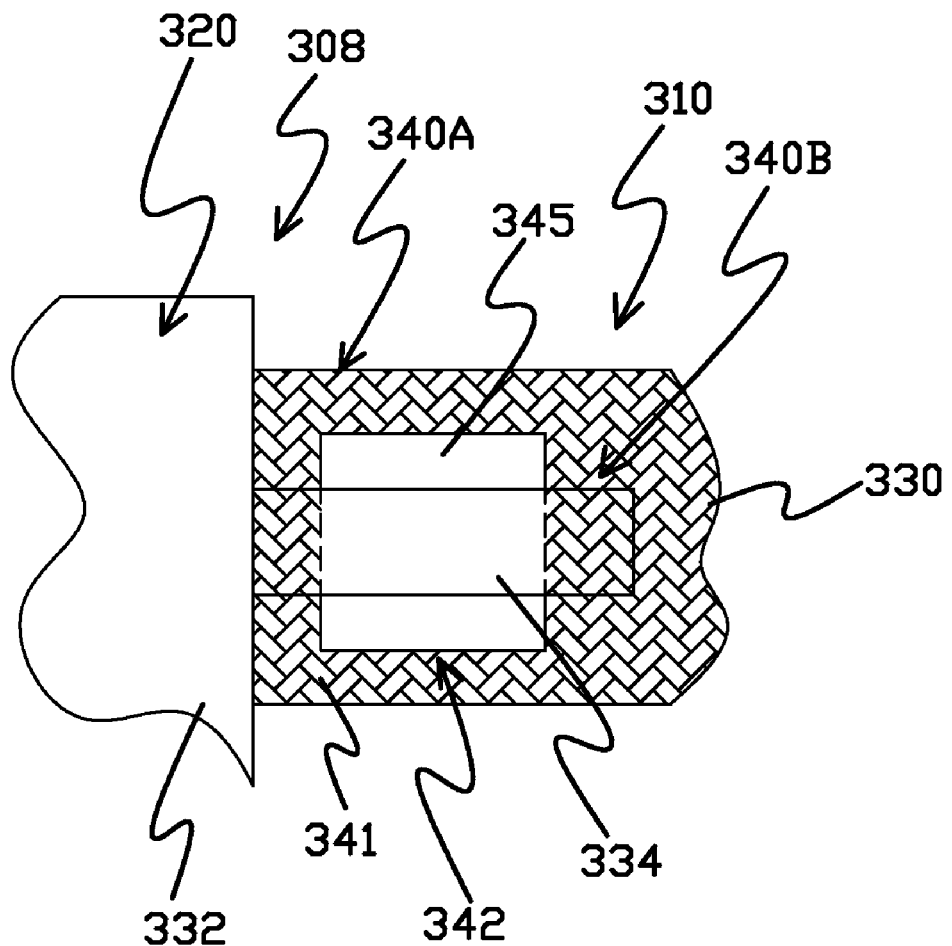
FIG. 8 is a detailed top view of a tab in accordance with still another embodiment of the invention.

FIG. 8 is a detailed illustration of a portion of a load beam 308 suspended from another suspension component or a panel (neither of which are shown in the figure) by a poly tab 310 in accordance with another embodiment of the invention. The load beam 308 and poly tab 310 are formed from a laminate including a first metal layer 330, a second metal layer 332 and an adhesive insulating or other polymer layer 334 between the first and second metal layers. Tab 310 includes a pair of hip regions 340A and 340B on opposite sides of a detab region 342. Region 340A is adjacent to the beam region 320 of the load beam 308, and includes only a tab 341 in the first metal layer 330 extending from the load beam and the insulating layer 334. Region 340B also includes only the first metal layer 330 and the insulating layer 334. Detab region 342 includes the first metal layer 330 and the insulating layer 334. As shown, the first metal layer 330 includes an aperture or window 345 at the detab region 342, and the insulating layer 334 is a strip extending across the window. The insulating layer 334 has a width that is less than the width of the window 345 in the illustrated embodiment. In other embodiments (not shown), the insulating layer 334 can have a width equal to or greater than the width of the window 345. The insulating layer 334 at the detab region 342 of tab 310 provides substantial support, enabling the size of the metal layer 330 in the tab region to be minimized.

Although the present invention has been described with reference to preferred embodiments, those skilled in the art will recognize that changes can be made in form and detail without departing from the spirit and scope of the invention.

For example, although shown in connection with load beams having two layers of metal separated by an insulating layer, the tabs can be used with other suspension components (e.g., flexures) and components having other structures (e.g., structure having only a single metal layer and insulating material detab regions, or structures formed from stainless steel, polyimide and copper alloy layers). Any portion or region of tabs 10A-10D can also be combined with other portions or regions of other tab embodiments. Furthermore, although the illustrated embodiments of the detab regions have only the described insulating layers, other embodiments (not shown) can include other layers of material (e.g., adhesives, covercoats, other polymers) that can be severed along with the insulating layer without providing metal particles or other debris that can compromise the operation of the suspension component or the disk drive into which it is incorporated.

What is claimed is:

1. A method for manufacturing disk drive head suspension components including a first metal layer and a polymer layer, comprising forming a plurality of suspension components and a carrier strip, wherein each of the plurality of suspension components is supported from one or both of the carrier strip and one or more others of the plurality of suspension components only by tabs including detab regions consisting of the polymer layer; and severing the polymer layer at the detab regions to detab the suspension components from one or both of the carrier strip and the one or more others of the plurality of suspension components.

2. The method of claim 1 and further comprising forming tabs including a hip region adjacent to the detab region, the hip region including the polymer layer and the first metal layer.

3. The method of claim 1 for manufacturing suspension components further including a second metal layer opposite the polymer layer from the first metal layer.

4. The method of claim 3 and further comprising forming tabs including a hip region adjacent to the detab region, the hip region including the first metal layer.

5. The method of claim 3 and further comprising forming tabs including transition regions on opposite sides of the detab regions, wherein the transition region on a first side of the detab region includes the first metal layer and the polymer layer, and the transition region on a second side of the detab region includes the second metal layer and the polymer layer.

6. The method of claim 3 and further comprising forming tabs including a capture region adjacent to the detab region, the capture region including the first and second metal layers on opposite sides of the polymer layer.

7. The method of claim 3 and further comprising forming tabs including a shoulder region adjacent to the detab region, the shoulder regions including the polymer layer and the second metal layer.

8. The method of claim 1 wherein the polymer layer is an insulating layer.

9. A method for manufacturing disk drive head suspension components, comprising forming a plurality of suspension components including metal structures and a carrier strip, wherein each of the plurality of suspension components is supported from one or both of the carrier strip and one or more others of the plurality of suspension components only by tabs including detab regions consisting of one or more layers of polymer; and severing the one or more layers of polymer at the detab regions to detab the suspension components from one or both of the carrier strip and the one or more others of the plurality of suspension components.

10. A method for manufacturing disk drive head suspension components including a first metal layer and a polymer layer, comprising forming a plurality of suspension components and a carrier strip, wherein each of the plurality of suspension components is supported from one or both of the carrier strip and one or more others of the plurality of suspension components by tabs including detab regions including the first metal layer, an aperture in the first metal layer, and a strip of the polymer layer extending over the aperture in the first metal layer; and severing the first metal layer and the polymer layer at the detab regions to detab the suspension components from one or both of the carrier strip and the one or more others of the plurality of suspension components.

* * * * *